(12) United States Patent
Shibasaki et al.

(10) Patent No.: US 7,823,291 B2
(45) Date of Patent: Nov. 2, 2010

(54) ROTARY CUTTER FOR MOWING MACHINE

(75) Inventors: Minoru Shibasaki, Tokyo (JP); Hiroki Kato, Tokyo (JP)

(73) Assignee: Starting Industrial Co., Ltd., Tokyo (JP)

( * ) Notice: Subject to any disclaimer, the term of this patent is extended or adjusted under 35 U.S.C. 154(b) by 488 days.

(21) Appl. No.: 11/785,312

(22) Filed: Apr. 17, 2007

(65) Prior Publication Data
US 2007/0251101 A1 Nov. 1, 2007

(30) Foreign Application Priority Data
Apr. 27, 2006 (JP) ............................ P2006-124481
Dec. 27, 2006 (JP) ............................ P2006-352261

(51) Int. Cl.
*B26D 7/00* (2006.01)
*A01D 34/416* (2006.01)

(52) U.S. Cl. ............................ 30/276; 30/347; 56/12.7

(58) Field of Classification Search .................. 30/347, 30/276, DIG. 5; 56/12.7, 12.5
See application file for complete search history.

(56) References Cited

U.S. PATENT DOCUMENTS

| | | | | |
|---|---|---|---|---|
| 4,236,312 A | * | 12/1980 | Foster et al. .................. | 30/276 |
| 4,285,127 A | | 8/1981 | Zerrer et al. | |
| 4,366,621 A | * | 1/1983 | Mitchell ....................... | 30/276 |
| 4,483,069 A | * | 11/1984 | Moore .......................... | 30/276 |
| 4,607,431 A | * | 8/1986 | Gay .............................. | 30/276 |
| 4,835,867 A | * | 6/1989 | Collins et al. ................. | 30/276 |
| 4,897,923 A | * | 2/1990 | Collins ......................... | 30/276 |
| 5,010,649 A | * | 4/1991 | Hoffmann .................... | 30/276 |
| 5,193,278 A | | 3/1993 | Osakabe et al. | |
| 2003/0000363 A1 | * | 1/2003 | Hofmann et al. ............. | 83/837 |

FOREIGN PATENT DOCUMENTS

JP          05-168328          7/1993

* cited by examiner

*Primary Examiner*—Boyer D Ashley
*Assistant Examiner*—Omar Flores-Sánchez
(74) *Attorney, Agent, or Firm*—Nixon & Vanderhye P.C.

(57) ABSTRACT

A rotary cutter for a mowing machine includes a cord for mowing grass by rotating, a reel which contains the cord and intermittently rotates to pay out the cord, a case which contains the reel, and a cover which covers the case, wherein the reel includes an upper cam and a lower cam, a stopper is incorporated in the case at a center of a bottom thereof, one end of the stopper is engaged with the upper cam thereby to stop the rotation of the reel, the other end of the stopper is engaged with the lower cam, one end of the cord is engaged with the stopper from outside thereof and guided out of the rotary cutter through a cord guide, and the other end of the cord is guided out of the rotary cutter without touching the stopper.

7 Claims, 6 Drawing Sheets

ROTARY CUTTER FOR MOWING MACHINE

BACKGROUND OF THE INVENTION

1. Field of the Invention

The present invention relates to a rotary cutter for a mowing machine for mowing grass or the like by a cord (generally made of nylon) which is drawn out in a radial direction of a case which is driven through a rotary shaft by a driving power of a motor or the like, and more particularly, to the rotary cutter of a type that the cord will be automatically drawn out in case where the cord has been worn out and become short.

2. Background Art

Conventionally, it has been a mainstream method in the rotary cutter of this type that a nylon cord is contained in a reel, and for the purpose of drawing out the cord when the cord has been worn out, the cord will be drawn out by pressing the cutter to the ground during rotation, striking the cutter, or increasing rotation speed of the cutter. However, the method of drawing out the cord by pressing the cutter to the ground or by striking the cutter has been dangerous, because small stones may be scattered. Moreover, the method of increasing the rotation speed has incurred a complicated structure and an increase of weight, and the cord had to be drawn out by increasing the rotation speed to the highest. Therefore, both the methods have had such problems that the motor which is a power source and the cutter have been subjected to excessive strain, and it has been unstable and very dangerous to draw out the cord.

In order to solve the above described problems, the applicant has already proposed a rotary cutter employing such a method that the cord will be automatically drawn out of the reel, when the cord has been worn out and become short during mowing work (Reference should be made to JP-A-5-168328). This method has the following advantageous features. When a drawn length of the cord has become short, the cord will be automatically drawn out with a change of centrifugal force, even during the work, and therefore, the above described operation such as pressing or striking the cutter, or increasing the rotation speed is not required. In addition, exchange of the cord can be easily and safely conducted, because the structure is simple.

SUMMARY OF THE INVENTION

However, in case of the conventional rotary cutter as described above, there has been a disadvantage that when the cord has become short and is automatically drawn out during mowing work, a ring which is one of components rotatably incorporated in the case will be rapidly rotated due to the centrifugal force by the rotation and resistance of grass to be cut, and the ring may be broken by a strong shock which occurs when a stopper in a substantially U-shape fitted to the ring is engaged with the case. In case where the stopper has been made thick, as a countermeasure, the stopper itself has become heavy to make the centrifugal force larger, which has lead to such a problem that the operation has started more quickly than desired, and the cord has become too long.

The invention has been made in order to solve the above described problems, and an object of the invention is to provide a rotary cutter which is simple in structure with stabilized drawing operation of a cord and enhanced accuracy of a drawn length of the cord, whereby a desired drawn length can be always maintained, and high working efficiency can be obtained.

According to the invention, there is provided a rotary cutter for a mowing machine including: a cord for mowing grass or the like by rotating; a reel which contains the cord and intermittently rotates to pay out the cord; a case which contains the reel; and a cover which covers the case, wherein the cord is guided out of the reel and performs mowing operation; the reel includes an upper cam and a lower cam respectively on its upper step and lower step; a stopper in a substantially U-shape having a substantially same length as a diameter of the reel is incorporated in the case at a center of a bottom thereof so as to slide in a diametrical direction; one end of the stopper is engaged with the upper cam thereby to stop the rotation of the reel; the other end of the stopper is engaged with the lower cam thereby to move the stopper in the diametrical direction; one end of the cord, which is wound around the reel, is engaged with the stopper from outside thereof and guided out of the rotary cutter through a cord guide; the other end of the cord is guided out of the rotary cutter without touching the stopper; when the cord, which is guided out, is worn out and become short while the rotary cutter is rotating, the one end of the stopper is disengaged from the upper cam with a centrifugal force thereby to rotate the reel to payout the cord; and when the reel continues to rotate, the stopper is moved in the diametrical direction due to the one end of the stopper which is engaged with the lower cam of the reel, and after a determined amount of rotation of the reel, the one end of the stopper is engaged again with the upper cam thereby to stop the rotation of the reel.

Moreover, according to the invention, the rotary cutter for a mowing machine having the above described structure is characterized in that for the purpose of stabilizing the drawn length of the cord more accurately, a resilient body for assisting a pressure of the cord which is applied to the stopper is provided inside the rotary cutter in such a manner that the pressure in the diametrical direction may be always applied to the stopper. As means for applying the pressure of the cord to the stopper by using the resilient body, a method of arranging the resilient body between the stopper and an inner wall of the case at a side where the stopper is engaged with the upper cam to stop the rotation of the reel, a method of fitting the resilient body at an end of the stopper at the side where the stopper is engaged with the upper cam to stop the rotation of the reel or to a center part of the stopper, a method of using, as the resilient body, a stopper pressing member which is integrally provided on the cover or the case respectively on an inner face of the cover or on an inner face of the case at the side where the stopper is engaged with the upper cam thereby to stop the rotation of the reel, or a method of using, as the resilient body, an arm-like member which is provided on the stopper itself at the side where the stopper is engaged with the upper cam thereby to stop the rotation of the reel and butted against an inner face of the case and/or the covermaybe employed. Moreover, a spring or a rubber body is generally used as the resilient body.

With the rotary cutter attached to a body of a mowing machine, lawn or grass will be usually cut by a cord which has been drawn out to an appropriate length. When the cord has been worn out and become short, cutting quality of the cord will be worsened, and working efficiency will be deteriorated. For this reason, it is necessary to always keep an appropriate length of the cord which has been drawn out. In this invention, when the cord has been worn out and become short while the rotary cutter is working, the stopper will move outward resisting the pressure of the cord with a centrifugal force generated with the rotation of the rotary cutter, and the stopper will be disengaged from the upper cam of the reel thereby to rotate the reel up to a next cam. Then, the cord will be paid out by a length corresponding to the rotation of the reel. At the same time, the stopper will be guided by the lower cam of the reel to be engaged with the upper cam of the reel, whereby the rotation of the reel will be stopped.

The rotary cutter for a mowing machine having the above described structure is so designed that when the cord has been worn out and become short, the cord will be automatically paid out to recover the length before it has been worn out. However, in case where a time difference occurs between a speed of paying out the cord when the reel rotates and an increase of a stopper pressing force of the cord, and the stopper pressing force of the cord cannot be obtained sufficiently, there is such anxiety that the stopper will move again outward by the centrifugal force generated with the rotation of the rotary cutter thus allowing the reel to rotate, and the cord will be paid out excessively. In short, there is a problem that the cord will be paid out excessively corresponding to a delay in the increase of the stopper pressing force of the cord. Moreover, because tension on the cord is weakened during low speed rotation of the rotary cutter, the stopper pressing force becomes unstable and malfunction of the stopper is liable to occur. Under the circumstances, according to the invention, in order to restrain the movement of the stopper until the pressure of the cord is increased to a desired value since the cord has been drawn out, the resilient body for assisting the pressure of the cord to be applied to the stopper is provided inside the rotary cutter in such a manner that the pressure in the diametrical direction may be always applied to the stopper.

The rotary cutter for a mowing machine according to the invention will achieve excellent effects as follows. When the cord has been worn out and become short, the centrifugal force of the outward extended portion of the cord will be weakened, and the centrifugal force exerted on the stopper which has been pressed inward by this cord will become stronger than the pressure of the cord, whereby the stopper will move outward, and will be disengaged from the cam of the reel. As the results, the reel will be rotated to move in a direction of rewinding the cord by the centrifugal force of the cord, whereby the cord will be automatically drawn out by a length corresponding to the rotation until the stopper is engaged with the next cam. In this manner, the cord will recover the original length before it has worn out. Therefore, according to the invention, when the cord has been worn out and become short during the work, the cord will be automatically drawn out to a desired length by the centrifugal force. Accordingly, dangerous operation such as pressing, striking the rotary cutter or increasing the rotation speed in the prior art is not required. Moreover, the rotary cutter will not be broken by a shock which is generated by the centrifugal force due to the rotation and resistance of grass to be cut, even with the stopper having such thickness as not incurring an increase of weight, and it is possible to conduct mowing work always stably and efficiently.

Further, because the resilient body for assisting the pressure of the cord to be applied to the stopper is incorporated inside the rotary cutter, the cord will not be paid out excessively by the outward movement of the stopper, even in case where the stopper pressing force of the cord cannot be sufficiently obtained. In this manner, the drawn length of the cord can be stabilized more accurately. In addition, because the pressure of the cord will be assisted even during low speed rotation of the rotary cutter, malfunction of the stopper will never occur, and a determined drawn length can be always maintained.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

Figure 1:
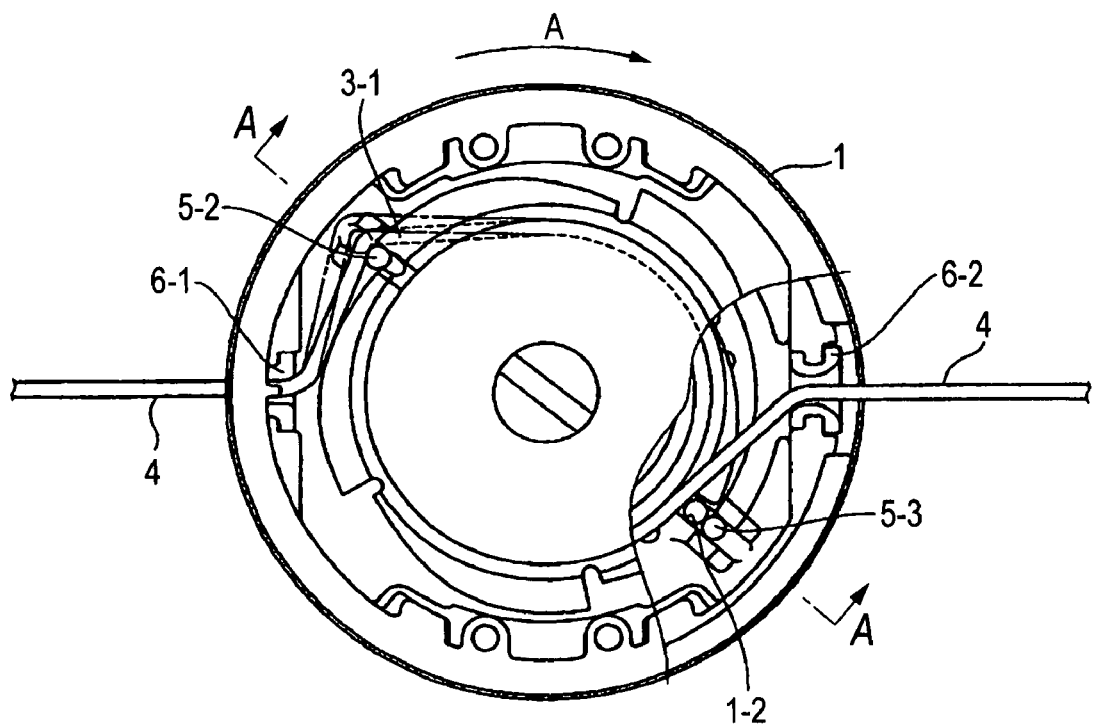
FIG. 1 is a plan view, partly cut away, showing a rotary cutter in a first embodiment according to the invention.
Figure 2:
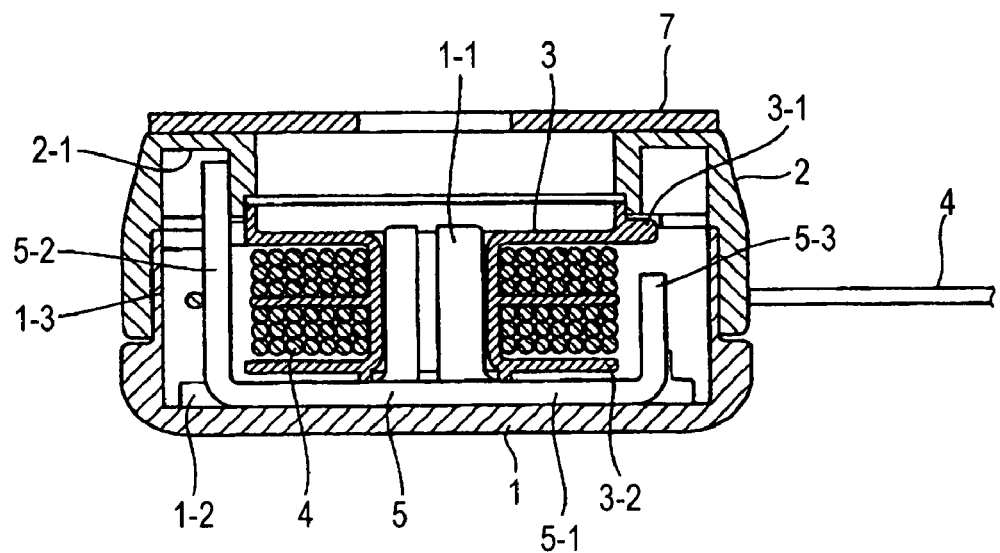
FIG. 2 is a sectional view taken along a line A-A in FIG. 1.
Figure 3:
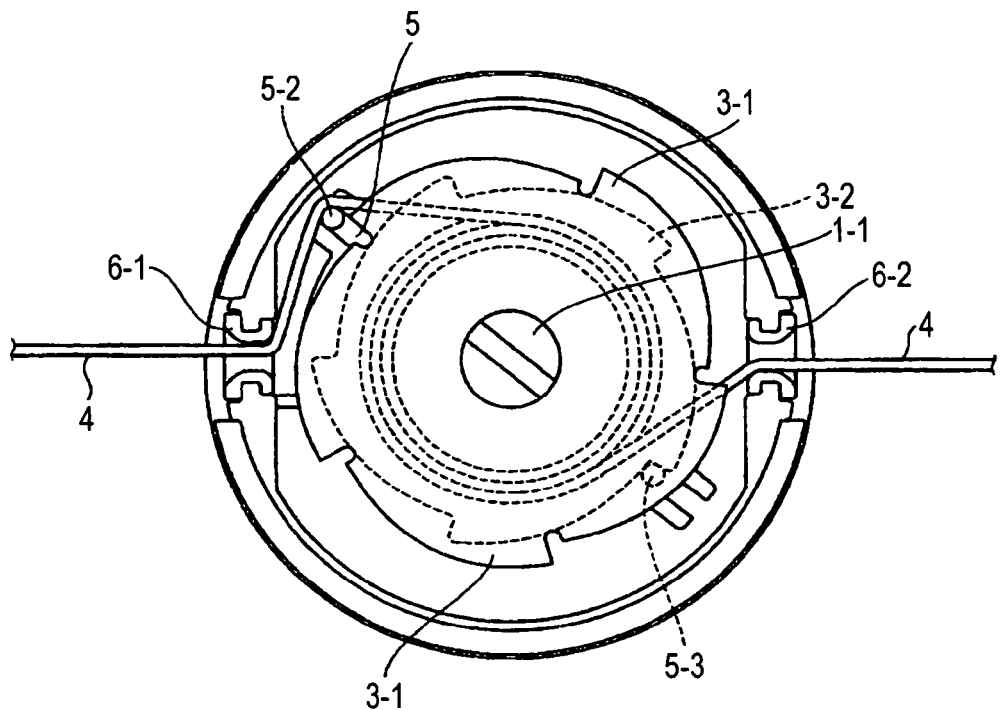
FIG. 3 is a plan view showing a stopper in a state engaged with an upper cam of a reel in the rotary cutter in FIG. 1.
Figure 4:
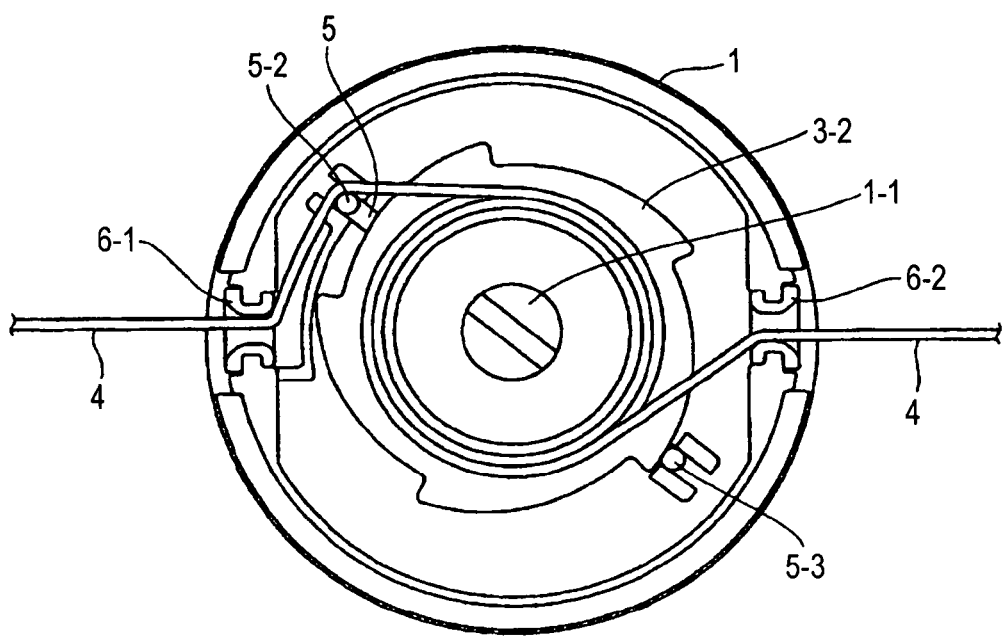
FIG. 4 is a plan view showing the stopper in a state guided by a lower cam of the reel in the rotary cutter in the rotary cutter in FIG. 1.
Figure 5:
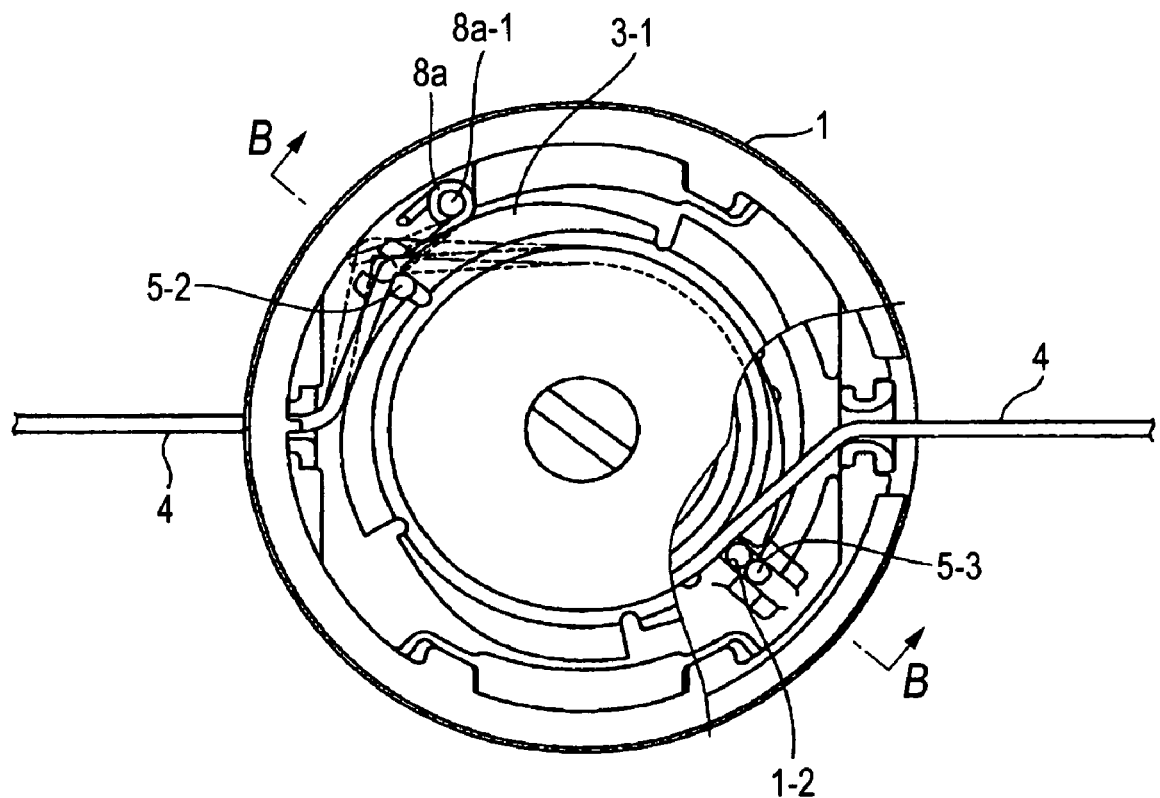
FIG. 5 is a plan view, partly cut away, showing a second embodiment of the invention.
Figure 6:
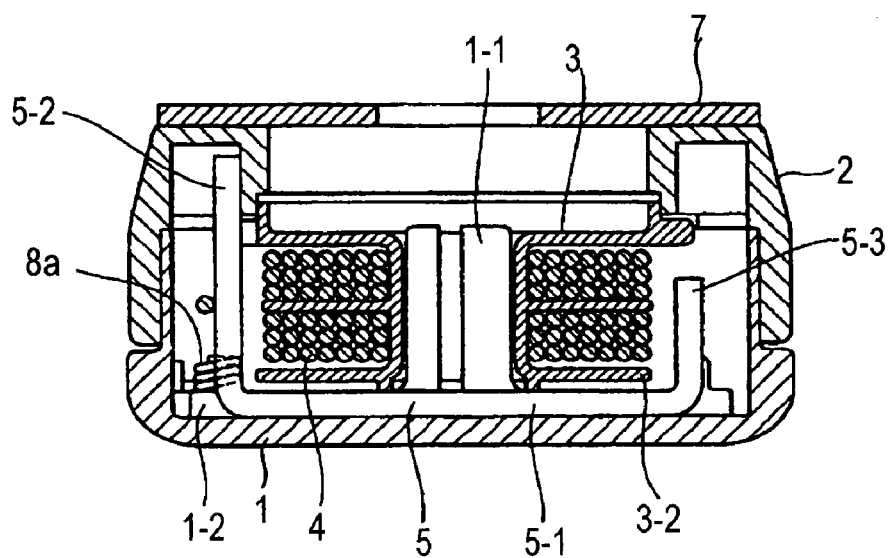
FIG. 6 is a sectional view taken along a line B-B in FIG. 5.
Figure 7:
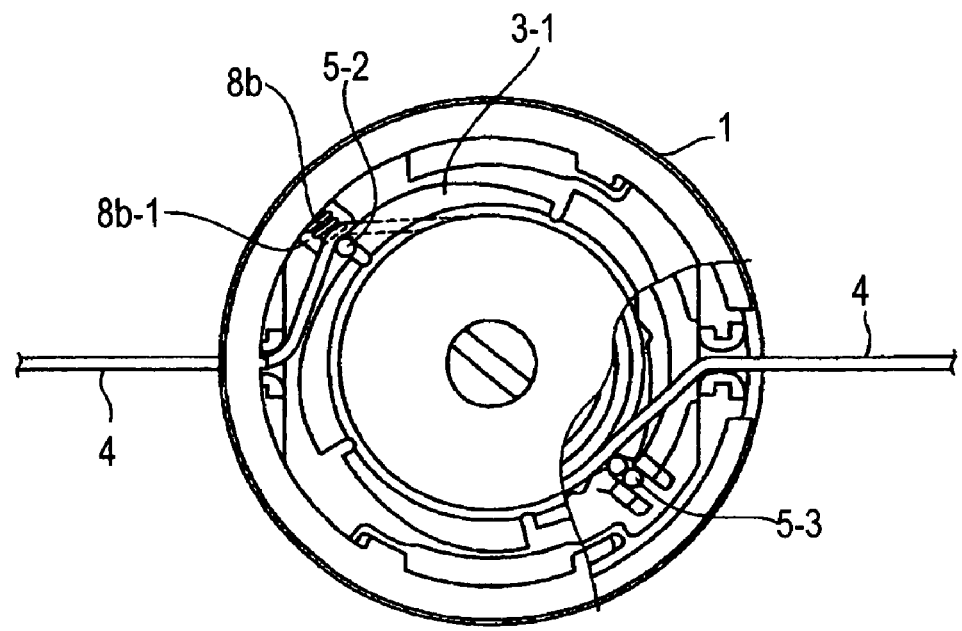
FIG. 7 is a plan view, partly cut away, showing a third embodiment of the invention.
Figure 8:
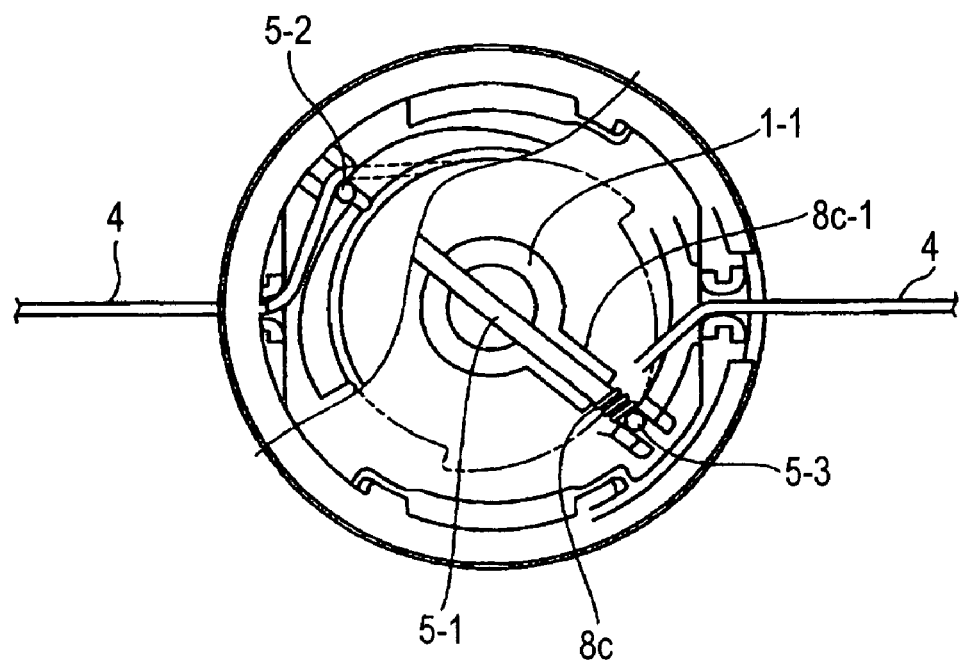
FIG. 8 is a plan view, partly cut away, showing a fourth embodiment of the invention.
Figure 9:
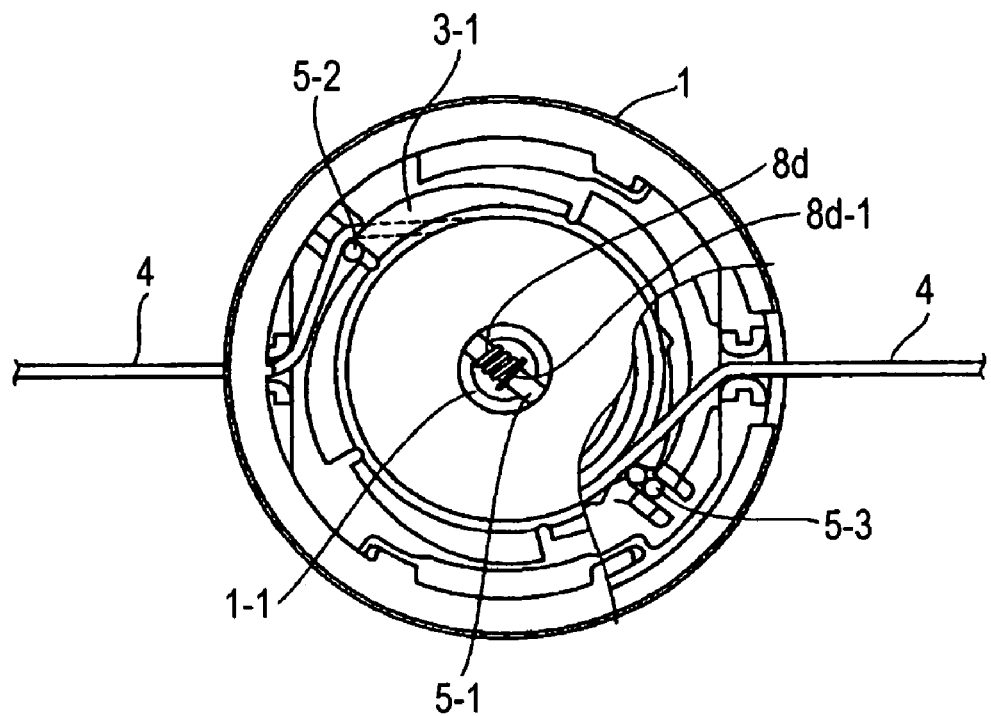
FIG. 9 is a plan view, partly cut away, showing a fifth embodiment of the invention.
Figure 10:
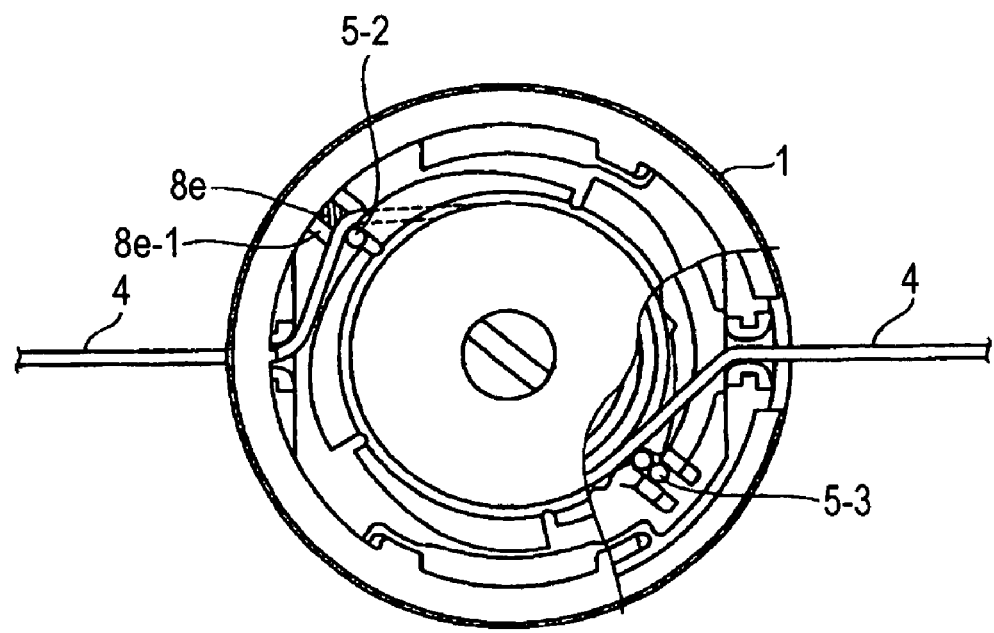
FIG. 10 is a plan view, partly cut away, showing a sixth embodiment of the invention.
Figure 11:
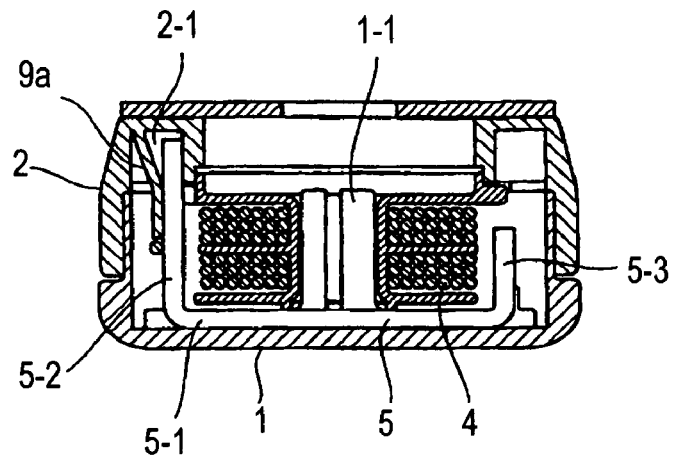
FIG. 11 is a view corresponding to FIG. 1 showing a seventh embodiment of the invention.
Figure 12:
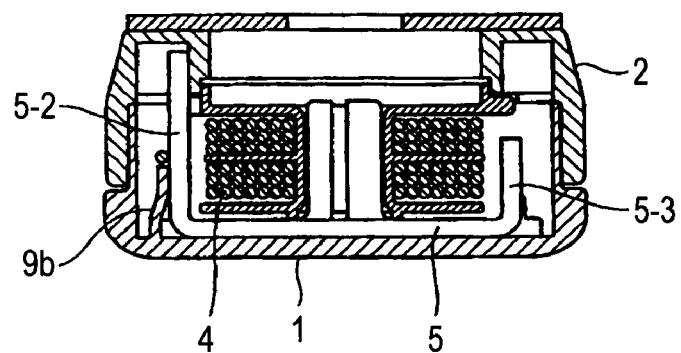
FIG. 12 is a view corresponding to FIG. 1 showing an eighth embodiment of the invention.
Figure 13:
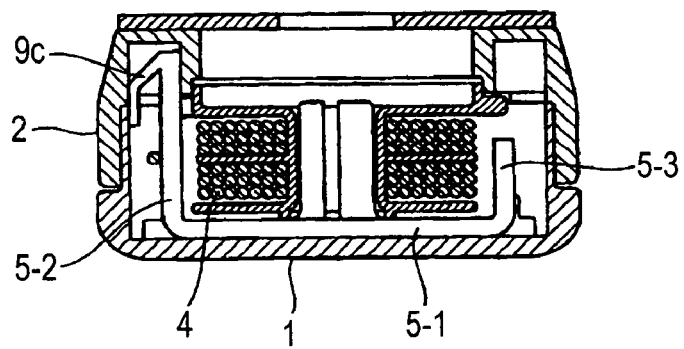
FIG. 13 is a view corresponding to FIG. 1 showing a ninth embodiment of the invention.

FIG. 1 is a plan view, partly cut away, showing a rotary cutter in a first embodiment according to the invention, FIG. 2 is a sectional view taken along a line A-A in FIG. 1, FIG. 3 is a plan view showing a stopper in a state engaged with an upper cam of a reel in the rotary cutter in FIG. 1, FIG. 4 is a plan view showing the stopper in a state guided by a lower cam of the reel in the rotary cutter in FIG. 1, FIG. 5 is a plan view, partly cut away, showing a second embodiment of the invention, FIG. 6 is a sectional view taken along a line B-B in FIG. 5, FIG. 7 is a plan view, partly cut away, showing a third embodiment of the invention, FIG. 8 is a plan view, partly cut away, showing a fourth embodiment of the invention, FIG. 9 is a plan view, partly cut away, showing a fifth embodiment of the invention, FIG. 10 is a plan view, partly cut away, showing a sixth embodiment of the invention, FIG. 11 is a view corresponding to FIG. 1 showing a seventh embodiment of the invention, FIG. 12 is a view corresponding to FIG. 1 showing an eighth embodiment of the invention, and FIG. 13 is a view corresponding to FIG. 1 showing a ninth embodiment of the invention. Numeral 1 is a case, 2 is a cover, 3 is a reel, 3-1 is an upper cam, 3-2 is a lower cam, 4 is a cord, 5 is a stopper in a substantially U-shape, 5-1 is a horizontal portion, 5-2 is a long length portion, 5-3 is a short length portion, 6-1, 6-2 are cord guides, 7 is a plate for connection with a motor or the like, 8a, 8b, 8c, 8d are springs, 8e is a rubber body, 9a, 9b are stopper pressing members, 9c is an arm-like member.

Firstly, structure of a rotary cutter in a first embodiment of the invention as shown in FIGS. 1 to 4 will be described. A case 1 is provided with a boss part 1-1 which is uprightly provided in a center part in a bottom of the case 1 for supporting rotation of a reel 3. A cylindrical wall 1-3 is provided at an outer peripheral edge of the case 1 except a part for drawing out a cord, and a cover 2 is fitted over the cylindrical wall 1-3. In addition, a plate 7 is attached to the cover 2, and connected to a rotary drive shaft (not shown) of a motor or the like. The reel 3 is formed with upper cams 3-1 and lower cams 3-2 respectively on an upper step and a lower step, and rotatably assembled to the boss part 1-1. A cord 4 is wound around the reel 3. A stopper 5 in a substantially U-shape has a horizontal portion 5-1, a long length portion 5-2 which is uprightly provided at one of opposite ends of the horizontal portion 5-1 and higher than the reel, and a short length portion 5-3 which is uprightly formed at the other end of the horizontal portion 5-1 and lower than the reel. The stopper 5 is incorporated in the bottom of the case 1 in a groove 1-2 which is provided in a center of a bottom of the boss part 1-1 so as to slide in a diametrical direction of the case 1, having the long length portion 5-2 vertically engaged with the upper cam 3-1 of the reel 3 in a detachable manner and having the short length portion 5-3 vertically engaged with the lower cam 3-2 of the reel in a detachable manner. Moreover, the cover 2 is provided with a groove 2-1 into which an upper part of the long length portion 5-2 of the stopper 5 in a substantially U-shape is inserted.

One end of the cord 4 which is wound around the reel 3 is passed outside the long length portion 5-2 of the stopper 5 in a substantially U-shape so as to inwardly press the long length portion 5-2 and guided outward through a cord guide 6-1. The other end of the cord 4 is passed inside the short length portion 5-3 of the stopper 5 in a substantially U-shape, and guided outward through a cord guide 6-2.

Then, operation of the rotary cutter having the above described structure will be described.

A rotary drive shaft (not shown) of the motor or the like is connected to the plate 7 above the cover 2 of the rotary cutter. While the rotary cutter is rotating, a centrifugal force is generated in the cord 4 which has been drawn out, and a force for drawing out the cord 4 will be generated. However, because the cord 4 has been drawn out through the long length portion 5-2 of the stopper 5 in a substantially U-shape, the stopper 5 in a substantially U-shape is pressed inwardly by the cord which has been tensioned. As the results, the long length portion 5-2 of the stopper 5 in a substantially U-shape is engaged with the upper cam 3-1 of the reel 3, thereby to stop the rotation of the reel 3.

While the rotary cutter is operated in this state, when the cord 4 has been worn out and become short, the centrifugal force of an outwardly extended portion of the cord 4 will be weakened. For this reason, the centrifugal force exerted on the stopper 5 in a substantially U-shape whose long length portion 5-2 has been inwardly pressed with the cord 4 in the case 1 becomes larger than the pressure of the cord 4. Then, the horizontal portion 5-1 of the stopper 5 in a substantially U-shape will slide in the groove 1-2 in the diametrical direction against the pressure, and will move outward. Consequently, the upper cam 3-1 of the reel 3 which has been locked by the long length portion 5-2 of the stopper 5 in a substantially U-shape will be set free, and the reel 3 will be rotated to move in a direction of rewinding the cord with the centrifugal force of the cord 4, whereby the cord 4 will be paid out. When the reel 3 has been rotated to move, the short length portion 5-3 of the stopper 5 in a substantially U-shape will be guided by the lower cam 3-2 of the reel, and the stopper 5 will slide in the opposite direction to the previous direction, allowing the long length portion 5-2 of the stopper 5 in a substantially U-shape to be locked to a next upper cam 3-1 of the reel 3 thereby to stop the rotation of the reel 3. In this manner, the pay out of the cord 4 will be stopped. In short, according to the invention, when the cord has been worn out and become short, the stopper 5 in a substantially U-shape will move against the pressure of the cord 4 due to the centrifugal force, and the long length portion 5-2 of the stopper will be disengaged from the upper cam 3-1 of the reel 3 thereby to rotate the reel 3 to move up to the next upper cam. Then, the cord will be paid out by a length corresponding to this rotation of the reel and become longer, to be restored to the original state before it has been worn out.

It goes without saying that the substantially same operation and effect can be obtained in case where the cutter is rotated in the opposite direction to the direction in the drawing (as shown by an arrow mark A in FIG. 1).

Then, in the rotary cutter for a mowing machine having the above described structure, the rotary cutter in which a resilient body for assisting the pressure of the cord which is applied to the stopper is incorporated, for the purpose of stabilizing the drawn length of the cord more accurately, will be described referring to FIGS. 5 to 13.

In a second embodiment of the invention as shown in FIGS. 5 and 6, there is employed a method of arranging the resilient body between the stopper 5 and an inner wall of the case at a side where the stopper is engaged with the upper cam 3-1 to stop the rotation of the reel 3, as means for applying the pressure of the cord to the stopper by using the resilient body. Specifically, a spring 8a is used as the resilient body for assisting the pressure of the cord 4 to be applied to the stopper 5. The spring 8a will be incorporated between the stopper 5 and the inner wall of the case 1 at the side where the stopper is engaged with the upper cam 3-1 thereby to stop the rotation of the reel 3. On this occasion, the spring 8a will be incorporated in such a manner that its coil part is fitted over a pin 8a-1 which is uprightly provided at an end of the bottom of the case 1, while its longer end is butted against the long length portion 5-2 of the stopper 5, and its shorter end is butted against the inner peripheral face of the case 1 so that the pressure in the diametrical direction may be always applied to the stopper 5.

Because the spring 8a is incorporated between the stopper 5 and the inner wall of the case 1 at the side where the stopper is engaged with the upper cam 3-1 thereby to stop the rotation of the reel 3, as described above, the stopper 5 will be additionally pressed with the spring 8a and will hardly move, even though the pressure of the cord which has been drawn out and applied to the stopper 5 is weak. Therefore, the stopper 5 will not move outward again to pay out the cord 4 excessively, and it is possible to adjust the drawn length of the cord 4 more accurately and stably. Moreover, even at a low speed rotation of the rotary cutter, malfunction of the stopper 5 will never occur, because the pressure of the cord 4 is assisted, and it is possible to always maintain a determined drawn length of the cord.

Similarly, in a third embodiment as shown in FIG. 7, as the means for applying the pressure of the cord to the stopper by using the resilient body, a coil spring 8b is employed in place of the spring 8a in the second embodiment of the invention as shown in FIGS. 5 and 6. In a structure for fitting the coil spring 8b, the coil spring 8b is incorporated in a guide 8b-1 which is projected from the inner peripheral wall of the case 1 opposed to the long length portion 5-2 of the stopper 5 so that the pressure in the diametrical direction may be always applied to the stopper 5. By action of the coil spring 8b, the substantially same operation and effect as in the rotary cutter as shown in FIGS. 5 and 6 can be obtained.

Similarly, in a fourth embodiment of the invention as shown in FIG. 8, there is employed a method of fitting a coil-like spring 8c to the stopper 5 itself, as the means for applying the pressure of the cord to the stopper by using the resilient body. In this structure, the coil-like spring 8c is fitted to the stopper 5 itself between the short length portion 5-3 of the horizontal portion 5-1 of the stopper 5 and a guide part 8c-1 for the stopper 5 which is uprightly provided at a root of the boss part 1-1 of the case 1 so that the pressure in the diametrical direction may be always applied to the stopper 5. In this embodiment too, by action of the coil spring 8c, the substantially same operation and effect as in the rotary cutter as shown in FIGS. 5 and 6 can be obtained.

Similarly, in a fifth embodiment of the invention as shown in FIG. 9, there is employed a method of fitting a coil-like spring 8d to the stopper 5 itself in the same manner as in the embodiment as shown in FIG. 8, as the means for applying the pressure of the cord to the stopper by using the resilient body. In this structure, the coil-like spring 8d is fitted to the stopper 5 itself between a disc-like spring seat 8d-1 which is fixed to a substantially center part of the horizontal portion 5-1 of the stopper 5 and the root of the boss part 1-1 of the case 1 so that the pressure in the diametrical direction may be always applied to the stopper 5. In this embodiment too, by action of the coil spring 8d, the substantially same operation and effect as in the rotary cutter as shown in FIGS. 5 and 6 can be obtained.

Similarly, in a sixth embodiment of the invention as shown in FIG. 10, as the means for applying the pressure of the cord to the stopper by using the resilient body, a rubber body is employed in place of the aforesaid spring. This embodiment has the same structure as the third embodiment as shown in FIG. 7 except that a rubber body 8e is used in place of the coil spring 8b in the third embodiment as shown in FIG. 7. Specifically, the rubber body 8e is incorporated in a guide 8e-1 which is projected from the inner peripheral wall of the case 1 opposed to the long length portion 5-2 of the stopper 5 so that the pressure in the diametrical direction may be always applied to the stopper 5. In this embodiment too, by action of the rubber body 8e, the substantially same operation and effect as in the rotary cutter as shown in FIGS. 5 and 6 can be obtained.

Similarly, in a seventh embodiment of the invention as shown in FIG. 11, as the means for applying the pressure of the cord to the stopper by using the resilient body, there is employed a method of using a part of the cover as the resilient body. In this structure, a stopper pressing member 9a is integrally provided on the cover 2, on a horizontal face of the groove 2-1 for receiving the long length portion 5-2 of the stopper 5 which is formed in the cover 2 at the side where the stopper is engaged with the upper cam 3-1 thereby to stop the rotation of the reel 3, in such a manner that the stopper pressing member 9a may be butted against the long length portion 5-2 of the stopper 5 and the pressure in the diametrical direction may be always applied to the stopper 5. In this embodiment too, by action of the stopper pressing member 9a, the substantially same operation and effect as in the rotary cutter as shown in FIGS. 5 and 6 can be obtained.

Similarly, in an eighth embodiment of the invention as shown in FIG. 12, as the means for applying the pressure of the cord to the stopper by using the resilient body, there is employed a method of using a part of the case as the resilient body. In the structure, a stopper pressing member 9b is integrally provided on the case 1, in the bottom of the case 1 at the side where the stopper is engaged with the upper cam 3-1 thereby to stop the rotation of the reel 3 so that the stopper pressing member 9b may be butted against the long length portion 5-2 of the stopper 5 and the pressure in the diametrical direction may be always applied to the stopper 5. In this embodiment too, by action of the stopper pressing member 9b, the substantially same operation and effect as in the rotary cutter as shown in FIGS. 5 and 6 can be obtained.

Similarly, in a ninth embodiment of the invention as shown in FIG. 13, as the means for applying the pressure of the cord to the stopper by using the resilient body, there is employed a method of using a part of the stopper as the resilient body. In the structure, an arm-like member 9c is provided at an end of the long length portion 5-2 of the stopper 5 so that the arm-like member 9c may be butted against the case 1 and/or the cover 2 at this side and the pressure in the diametrical direction may be always applied to the stopper 5. In this embodiment too, by action of the arm-like member 9c, the substantially same operation and effect as in the rotary cutter as shown in FIGS. 5 and 6 can be obtained.

The rotary cutter for a mowing machine according to the invention functions as follows. When the cord has been worn out and become short, the centrifugal force of the outwardly extended portion of the cord will be weakened, and the centrifugal force exerted on the stopper which has been pressed inward by this cord will become stronger than the pressure of the cord, whereby the stopper will move outward, and will be disengaged from the cam of the reel. As the results, the reel will be rotated to move in a direction of rewinding the cord by the centrifugal force of the cord, whereby the cord will be automatically drawn out by a length corresponding to the rotation until the stopper is engaged with the next cam. In this manner, the cord will recover the original length before it has been worn out. Accordingly, dangerous operation such as pressing, striking the rotary cutter or increasing the rotation speed as in the prior art is not required. Moreover, the rotary cutter will not be broken by a shock which is generated by the centrifugal force due to the rotation and resistance of the grass to be cut, even with the stopper having such thickness as not incurring an increase of weight, and it is possible to conduct mowing work always stably and efficiently.

Further, because the resilient body for assisting the pressure of the cord to be applied to the stopper is incorporated inside the rotary cutter, the cord will not be paid out excessively with the outward movement of the stopper, even in case where the stopper pressing force of the cord cannot be sufficiently obtained. In this manner, the drawn length of the cord can be stabilized more accurately. In addition, because the pressure of the cord will be assisted even during low speed rotation of the rotary cutter, malfunction of the stopper will never occur, and a determined drawn length can be always maintained.

Consequently, the rotary cutter for a mowing machine according to the invention is extremely useful as the rotary cutter for a lawn mower or a grass cutter.

What is claimed is:

1. A rotary cutter for a mowing machine comprising:
a cord for mowing grass or the like by rotating;
a reel which contains the cord and intermittently rotates to pay out the cord;
a case which contains the reel; and
a cover which covers the case, wherein:
the cord is guided out of the reel and performs mowing operation;
the reel includes an upper cam and a lower cam respectively on its upper step and lower step;
a stopper in a substantially U-shape having a substantially same length as a diameter of the reel is incorporated in the case at a center of a bottom thereof so as to slide in a diametrical direction between a first position in which the reel is prevented from rotating and a second position in which the reel is allowed to rotate;

one end of the stopper is engaged with the upper cam when the stopper is in the first position thereby to stop the rotation of the reel;

the other end of the stopper is engaged with the lower cam when the stopper is in the second position thereby to allow the rotation of the reel;

one end of the cord, which is wound around the reel, is engaged with the stopper from outside thereof and guided out of the rotary cutter through a cord guide;

the other end of the cord is guided out of the rotary cutter without touching the stopper;

when the cord, which is guided out, is worn out and become short while the rotary cutter is rotating, the one end of the stopper is disengaged from the upper cam with a centrifugal force thereby to rotate the reel to pay out the cord; and when the reel continues to rotate, the stopper is moved in the diametrical direction due to the other end of the stopper which is engaged with the lower cam of the reel, and after a determined amount of rotation of the reel, the one end of the stopper is engaged again with the upper cam thereby to stop the rotation of the reel.

2. A rotary cutter for a mowing machine according to claim 1, further comprising a resilient body for assisting a pressure of the cord which is applied to the stopper, wherein the resilient body is provided inside the rotary cutter in such a manner that the pressure in the diametrical direction is always applied to the stopper.

3. A rotary cutter for a mowing machine according to claim 2, wherein the resilient body is provided between the stopper and an inner wall of the case at a side where the stopper is engaged with the upper cam to stop the rotation of the reel.

4. A rotary cutter for a mowing machine according to claim 2, wherein the resilient body is provided on an end of the stopper at a side where the stopper is engaged with the upper cam to stop the rotation of the reel or a center part of the stopper.

5. A rotary cutter for a mowing machine according to claim 2, wherein the resilient body is a stopper pressing member which is integrally provided on the cover or the case respectively on an inner face of the cover or on an inner face of the case at a side where the stopper is engaged with the upper cam thereby to stop the rotation of the reel.

6. A rotary cutter for a mowing machine according to claim 2, wherein the resilient body is an arm-like member which is provided on the stopper itself at a side where the stopper is engaged with the upper cam thereby to stop the rotation of the reel and butted against at least one of an inner face of the case and an inner face of the cover.

7. A rotary cutter for a mowing machine according to claim 1, wherein the upper cam includes a plurality of cutouts formed in a circumference thereof, wherein, when the stopper is in the first position, the one end thereof comes into a corresponding one of the cutouts, wherein the lower cam includes a plurality of guide surfaces formed in a circumference thereof and tapered along a circumferential direction, and wherein, when the stopper is in the second position, the other end thereof comes in sliding contact with a corresponding one of the guide surfaces.

* * * * *